US006079251A

United States Patent [19]
Gaultier et al.

[11] Patent Number: 6,079,251
[45] Date of Patent: Jun. 27, 2000

[54] DIESEL EXHAUST ANALYSIS SYSTEM AND METHOD OF USING THE SAME

[75] Inventors: Philippe Gaultier, Vaudreuil; Sean McGinn, Ottawa; Donald Thibault, Chambly, all of Canada

[73] Assignee: Noranda Inc., Canada

[21] Appl. No.: 09/024,865

[22] Filed: Feb. 17, 1998

[51] Int. Cl.[7] .......................... G01M 15/00; F02B 27/00
[52] U.S. Cl. ........................ 73/23.31; 701/109; 73/23.33
[58] Field of Search ................. 73/23.31, 23.32, 73/118.1, 116, 117.2, 117.3, 23.33; 701/103, 104, 109

[56] References Cited

U.S. PATENT DOCUMENTS

| | | | |
|---|---|---|---|
| 3,603,155 | 9/1971 | Morris et al. | 73/23.31 |
| 3,909,384 | 9/1975 | Jasinski et al. | 204/195 |
| 3,924,442 | 12/1975 | Kerho et al. | 73/1 R |
| 3,998,095 | 12/1976 | Tinkham et al. | 73/23.31 |
| 4,007,096 | 2/1977 | Jasinski et al. | 204/1 T |
| 4,111,036 | 9/1978 | Frechette et al. | 73/23 |
| 4,141,241 | 2/1979 | Collin | 73/23.31 |
| 4,160,373 | 7/1979 | Fastaia et al. | 73/23.31 |
| 4,169,369 | 10/1979 | Chang | 73/23 |
| 4,314,344 | 2/1982 | Johns et al. | 364/500 |
| 4,328,546 | 5/1982 | Kreft et al. | 364/424 |
| 4,379,402 | 4/1983 | Harman, III | 73/23 |
| 4,670,405 | 6/1987 | Stetter et al. | 436/151 |
| 4,888,295 | 12/1989 | Zaromb et al. | 436/161 |
| 5,110,747 | 5/1992 | Pataschnick et al. | 73/23.31 |
| 5,469,731 | 11/1995 | Decker et al. | 73/23.31 |
| 5,490,490 | 2/1996 | Weber et al. | 73/23.32 |
| 5,531,105 | 7/1996 | Leong et al. | 73/116 |
| 5,571,724 | 11/1996 | Johnson | 436/116 |
| 5,580,433 | 12/1996 | Baker et al. | 204/425 |
| 5,711,021 | 1/1998 | Book | 73/23.31 |
| 5,868,116 | 2/1999 | Betts et al. | 73/116 |

*Primary Examiner*—George Dombroske
*Attorney, Agent, or Firm*—Fitzpatrick, Cella, Harper & Scinto

[57] ABSTRACT

The present invention is concerned with a system and method for monitoring the exhaust emissions of combustion engines such as diesel engines equipment used in underground mining operations. The system comprises a gas analyzer capable of measuring the concentration of at least one exhaust gas from the exhaust emissions, the analyzer being coupled to a computer that processes the data collected from the gas analyzer. The processed data is then displayed to the operator on a computer screen, so that the monitoring is carried out in real time.

13 Claims, 2 Drawing Sheets

DIESEL EXHAUST ANALYSIS SYSTEM AND METHOD OF USING THE SAME

FIELD OF THE INVENTION

The present invention relates to a system for the analysis of exhaust emissions from combustion engines, and more particularly diesel exhaust emissions. A method for analyzing undiluted emissions is also provided herein. Both the system and method are of particular interest to the mining industry because underground air quality is of paramount importance.

BACKGROUND OF THE INVENTION

Health and safety issues are a constant concern for mining companies operating underground mines. Hundreds of miners work underground daily in an environment where air quality is strictly regulated. Because substantially all underground vehicles travelling in mine drifts run with combustion engines, and since a high number of them are in operation concurrently, exhaust emissions from these vehicles represent an important polluter. It is therefore critical to properly maintain these diesel engines to avoid undesirably high emissions of gases such as carbon monoxide, nitrogen dioxide, nitrogen oxide, carbon dioxide, and the like. Controlling these emissions, or at least having a better knowledge of what they are, will have a direct beneficial impact on the mine ventilation requirements, which is one of the most expensive operating cost for underground mining, as well as on the health of the miners.

The monitoring of diesel exhaust emissions in underground mining environments has in the past been a somewhat less than exact science. Due to lack of understanding, lack of precision instruments for measuring emissions in the work environment, and lack of a common testing method, this critical component of mine operations has been left underdeveloped. Diesel exhaust emissions have consistently posed the problem of understanding what actually is coming out of the tailpipe of a diesel engine at any given time. Understanding and monitoring these emissions can improve the performance and maintenance of engines, and therefore bring the emissions to safer and healthier levels.

U.S. Pat. No. 4,328,546 is concerned with an automated engine diagnosing device using, among other things, a digital data processor. One of the objectives of this device is to display to the operator emissions data accumulated from a vehicle engine in an easy-to-understand form for facilitating automotive repairs. Another objective is to visually display to the operator an indication of the concentration of engine emission gases occurring in accordance with the efficiency of firing of a selected cylinder of the engine. Analyzers suitable for the purpose of this invention include those available for analyzing gases like carbon monoxide, nitrogen dioxide, nitrogen oxide, carbon dioxide, oxygen, etc. However, the method involves injecting individual cylinder faults only, and emissions based on a per cylinder basis. Further, the data acquisition and analysis is based on one peak value per engine cylinder. Finally, there is no mention or description of advanced data storage and analysis capabilities in the system.

It would therefore be highly desirable to develop a system to perform exhaust tests for tracking individual engine emissions by using a total engine state load factor. Such system would allow verification of engine maintenance and repairs, and further evaluation of exhaust after-treatment instruments. The method of use of such system should also be standard so that it can be applied to any type of combustion engine. Such system and method should also preferably allow the measurement of the gas temperature and pressure in the exhaust system.

SUMMARY OF THE INVENTION

In accordance with the present invention, there is now provided a method for monitoring the exhaust emissions of a combustion engine, the method comprising the steps of:
 a) inserting a gas probe in the exhaust system of the engine, the probe being coupled to a gas analyzer capable of measuring a gas concentration in the exhaust emissions of the engine, the gas analyzer comprising at least one gas sensor for sensing at least one gas;
 b) running the engine to effectively warm up exhaust gases, and optionally conducting a smoke test;
 c) initiating data collection from the gas analyzer for a period of time and at a rate sufficient to obtain a substantially constant concentration of gas measured in the exhaust emissions, and
 d) processing the data collected in step c) with processing means coupled to the gas analyzer, and displaying processed data in real time on display means coupled to the processing means, thereby allowing an operator to follow data collection and exhaust emissions monitoring through a progress window; and
 e) optionally storing the processed data in storing means.

The present invention is also concerned with a system for monitoring the exhaust emissions of a combustion engine. More specifically, the system comprises:
 a) a gas analyzer capable of measuring the concentration of at least one exhaust gas from the exhaust emissions, the gas analyzer comprising a gas probe to be inserted in the exhaust system and coupled thereto, the analyzer further comprising at least one gas sensor for sensing at least one exhaust gas;
 b) processing means for processing data collected from the gas analyzer; and
 c) display means coupled to the processing means to allow an operator to follow data collection in real time and to monitor exhaust emissions through a progress window.

IN THE DRAWINGS

FIG. 1 illustrates an example of a gauge control display window that can be seen by an operator on a computer screen; and FIG. 2 illustrates a flow chart of the present method.

DETAILED DESCRIPTION OF THE INVENTION

Figure 1:
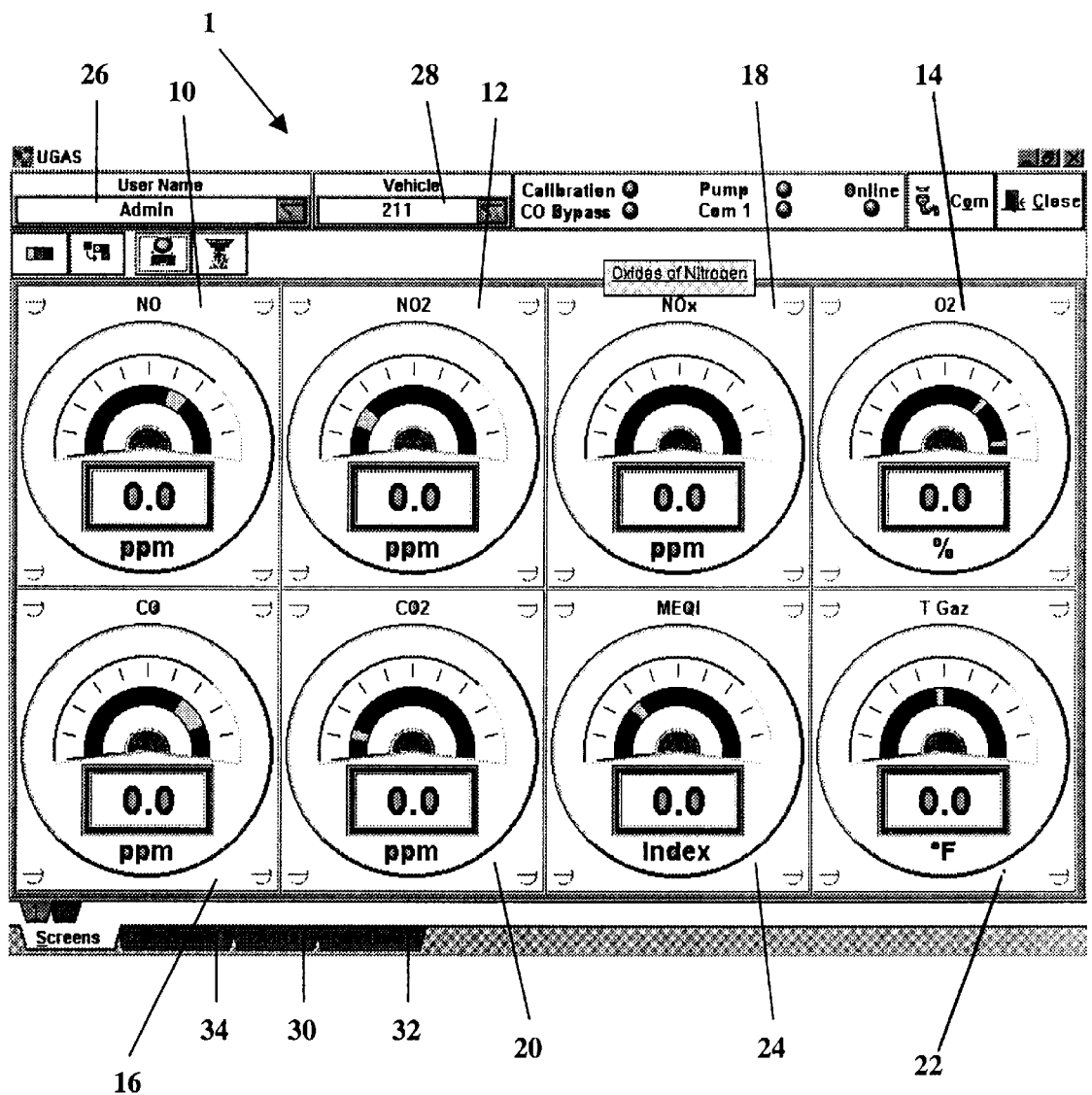

In the system and method of the present invention, the gas analyzer may be any conventional gas analyzer available on the market that is designed for the purpose of the invention. With respect to the analysis of diesel exhaust emissions, the analyzer should at least be capable of measuring the concentration of oxygen, carbon monoxide, nitric oxide, nitric dioxide, as well as the gas temperature and pressure. The analyzer should also preferably comprise processing means to calculate additional parameters useful to the operator or the engineer, such as total nitrogen oxides ($NO_x$), carbon dioxide if the latter is not measured by the analyzer, combustion efficiency and lambda. A good example of such analyzer is the ECOM AC+ manufactured by Rbr Computertechnik GmbH in Germany and sold by ECOM America Ltd in Duluth Ga., U.S.A. Obviously, if other gases or additional properties of the gases need to be monitored, measured and/or calculated, the appropriate analyzer can be easily selected by any operator or engineer of ordinary skill in the art, or the required sensor may be added to the analyzer.

Most gas sensors included in conventional gas analyzer are electrochemical with a thermocouple and resistance temperature device (RTD) for temperature measurements, and a piezo-resistive sensor for pressure measurements. The ECOM AC+ can incorporate up to six gas sensors. For the purposes of the present invention, it is not necessary to have sulphur dioxide and hydrocarbons sensors in the analyzer, because $SO_2$ can be calculated more accurately by knowing the sulphur content of the combustible in use. Nevertheless, if one wishes to have sulphur dioxide and hydrocarbons sensors, they can be added to the analyzer in any conventional manner.

The analyzer is generally capable of operating as a stand-alone device, which can acquire gas parameters and print out results. Operations are performed using the membrane keypad and LCD display. Acquired data is an instantaneous snapshot of all parameters stored to memory, which can then be printed. Each subsequent sample erases the previous sample from memory. Analyzers generally lack the flexibility to acquire time weighted average samples and store historical data in memory. To overcome this, the RS232 serial communication port on the analyzer was utilized. This port communicates all data in real time as it is acquired from all the sensors. Communicating this real time data to a software interface permits the flexibility required to store time weighted average samples to an integrated database.

A computer software application communicating directly with the gas analyzer has been developed. The software allows the display of all the measured and calculated values on a screen in real time. The software also comprises databases designed to allow the operator to save all the values of an exhaust test and relate it to the specific vehicle tested, as well as the time and date, and a description identifier for each test. The description identifier is a tool that indicates the location position of the gas probe on the exhaust system for the test currently performed. Such information is useful because the gas probe can be inserted at various locations on the exhaust system, and not only in the tailpipe. The gas probe comprises a tube or hose that is inserted into and fitted on the exhaust system in a conventional manner.

The description identifier also allows the operator to examine the effectiveness of any after treatment devices such as diesel oxidation catalysts (DOC) or particulate filters. It also helps the operator to better understand the differences between different exhaust banks on engines. In addition, all tests are saved to the local database, i.e., the operator computer, as well as exported automatically to a mainframe database. The software also comprises an import and graphic analysis function that allows the operator to perform filtered data requests. The information can be used as a troubleshooting tool, and the operator can see any trends in the data and infer possible corrections. The operator may also decide if it is necessary to make repairs to the engine systems.

FIG. 1 is an example of gauge controls that can be seen by the operator on gauge control display window 1 appearing on the computer screen. These gauge controls permit the user to configure warning and alarm display levels for each parameter, namely the concentrations of NO 10, $NO_2$ 12, $O_2$ 14, and CO 16. The calculated concentrations of $NO_x$ 18 and $CO_2$ 20 are also provided. Finally, the temperature of the exhaust gas 22 and the Modified Exhaust Quality Index (MEQI) 24 also appear. This index, which is well known in the filed, is calculated from the measured concentrations of CO, NO, and $NO_2$ according to the following equation:

$$MEIQ=([CO]\div 25)+([NO]\div 25)+([NO_2]\div 3)$$

This index allows the operator to obtain a general idea of the total emissions of the engine without the necessity to obtain the specific concentrations of carbon monoxide, nitrogen oxide and nitrogen dioxide.

Boxes 26 and 28 are also provided respectively for the identification of the operator working on the system, and the vehicle. The gauge control display window has the flexibility to configure any combination of parameters. For obvious space availability, generally not more than eight parameters are displayed on each window.

Other display windows can be provided (not shown), such as for graphic chart analysis, custom function editing ("Functions"), and databases, as illustrated by tabs 30, 32 and 34 respectively at the bottom of window 1. The chart analysis window preferably has a list of query filters to select from in querying historical databases. Such filters include vehicle number, vehicle type, location, dates and other related fields, which can be easily determined by the operator. The results of each query are displayed in an adjacent graphic analysis screen with flexibility to arrange the data in several different formats, according the operator needs.

A function calculator screen may optionally be provided to the operator for customizing parameters. The function calculator screen allows the creation of custom mathematical functions between the acquired parameters in the database. An example of this is $NO_x$ concentration parameter 18, which is the sum of the concentrations of $NO+NO_2$. As functions are created, they are added to the list of parameters and drawn on the historical data to calculate individual values. Another feature of the function screen is a configuration menu for target values for each parameter on each type of engine.

The database is a series of tables combined to provide functionality to the software, as well as detailed and descriptive historical data. Multi-level security access can be built into the application to ensure consistency in testing and protect the databases from possible loss due to corruption. Again, such feature can be easily added by any one of ordinary skill in the art of computer programming.

Operators log into the application and are provided with all necessary tools to conduct the sampling process from start to finish. They are also provided with access to the graphic analysis tools for troubleshooting and evaluating trends. An integrated testing procedure, i.e., the method of the present invention, has been built into the software to assist the operators in testing emissions. A sequence of screens and menus guides the operator from start to finish in the testing process.

Lookup tables from the database provide automated entry of data such as description identifiers for each test. At the completion of a test, the final screen provides a test report for the operator with measured concentrations, target values, time, date, and operator and vehicle information. The operator then has the option of printing the report and/or saving the values to the local database.

The present method has been designed to perform a complete undiluted exhaust test on diesel engines, particularly underground diesel engines, and to ensure, to the greatest possible degree, accurate and consistent testing of diesel exhaust emissions. The present method is exemplified for underground diesel mobile equipment. Obviously, the same method can be extended to any type of combustion engine generating emissions, whether on the ground or underground.

Figure 2:
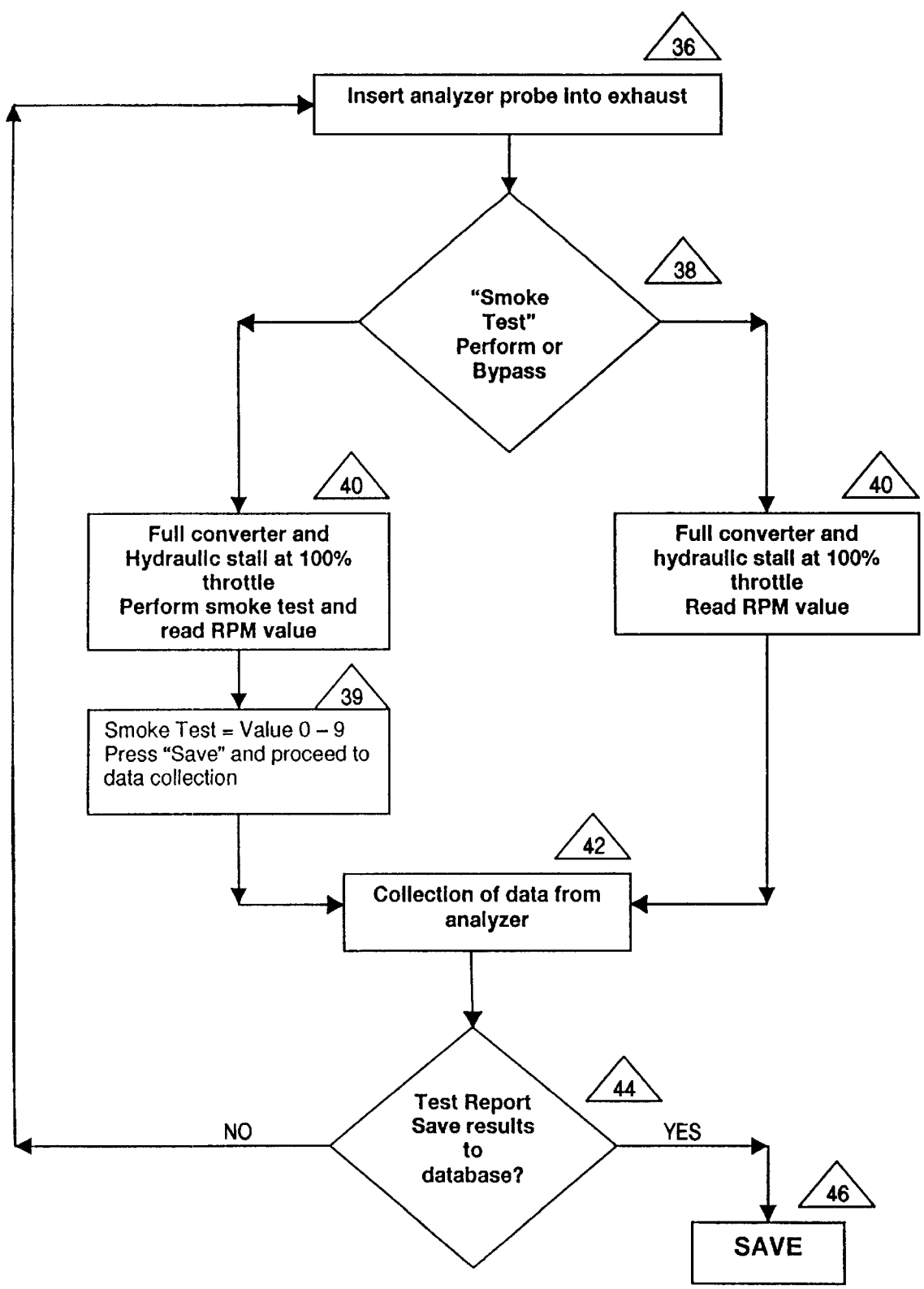

To describe a preferred embodiment of the method, reference will be made to FIG. 2, which is a flowchart of the various steps of the method. Initially, the probe of the analyzer is inserted in a fitting on the exhaust system, as per step 36. The engine is then run at full throttle, full converter and hydraulic stall condition to obtain an air-fuel ratio consistent with government engine certification standards. Generally speaking, in underground mines, at least 60 seconds are required to effectively warm up exhaust gases, as per step 40. During this operation, the engine rpm is read, and the observed value is displayed to the operator in a rpm box on the computer screen. Step 40 is important because if exhaust emissions are not at maximum temperature, the measured gas concentrations will be higher because of poor combustion efficiency. More importantly is the consistency of the data. In order to efficiently compare results, it is important that the method be carried out under similar conditions, otherwise the results would be meaningless. Cold emissions temperature will translate into higher CO concentrations, and thus would probably cause the engine to fail CO limit requirements. The intent of the present method is to ensure that any improper combustion is sourced by the engine, and not by the method. Further, the method is designed to mimic the vehicle in typical working conditions.

Before the warm up, the operator has the option of including a conventional smoke test, as per step 38. This test 39 consists in measuring the smoke concentration (soot) on a filter paper and compared to 0–9 scale on Bacharach chart to establish value. The results provide a basic indication of excessive engine smoking conditions, and can be input by the operator in the computer to appear on the computer screen.

Warm up of the engine is done at full throttle and stall condition, as per step 40, and the data collection is subsequently started, as per step 42. The operator can vary the data collection period and rate as desired. Nevertheless, to appropriately compare data from 2 or more engines of the same kind, it is imperative that the data be collected in the same manner and according to the same conditions. For example, for combustion engine used in underground equipment, a data collection period of 60 seconds is preferred, with data collected every 2 seconds. During the collection period, the operator can follow on the computer screen the collection progress in real time through a test window, and may stop the collection at any point in time. If that happens, no data will be saved to the database. Upon completion of the collection, the engine can return to idle, or turned off.

At the end of the test, a window opens automatically on the screen and the test report 44 can be viewed, as well as the established target values specific to each mine site. The results can be stored as per step 46 in an "Export" file locally, and may be printed if necessary. The export file may subsequently be sent to the mainframe. If the results of the test are not stored, the operator may do the test sequence one more time.

The mainframe database provides the operator with graphic results of previous emission tests. As the database grows, it contains valuable information for creating benchmarks and tracking engine and vehicle performance.

The Windows™ software used in the present system has been developed to communicate with the gas analyzer, and features an integrated testing method, database tools, and a function calculator for customized parameters. Using the function calculator, a Modified Exhaust Quality Index (MEQI) can be calculated for each engine. The information is displayed on the computer display, and allows the data to be recorded for future use. Using the MEQI, the operator can detect engine problems and track engine performance over time by plotting the MEQI history.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A method for monitoring the exhaust emissions of a combustion engine, the method comprising the steps of:
    (a) inserting a gas probe in the exhaust system of the engine, the probe being coupled to a gas analyzer capable of measuring gas concentration in the exhaust emissions of the engine, the gas analyzer comprising at least one gas sensor for sensing at least one gas;
    (b) running the engine at operating temperature, and stabilizing the exhaust gas temperature to a maximum value with a 60 second engine stall-smoke density test;
    (c) initiating data collection from the gas analyzer for a period of time and at a rate sufficient to obtain a substantially constant concentration of gas measured in the exhaust emissions; and
    (d) processing the data collected in step (c) with processing means coupled to the gas analyzer, and displaying processed data in real time on display means coupled to the processing means, thereby allowing an operator to follow data collection and exhaust emissions monitoring through a progress window; and
    (e) storing the processed data in storing means.

2. A method according to claim 1 wherein in step b), the engine is run at full throttle, full converter and hydraulic stall conditions.

3. A method according to claim 2 wherein full throttle, full converter and hydraulic stall conditions are maintained during data collection in step c).

4. A method according to claim 1 wherein in step c, data is collected at a frequency not less than every 2 seconds for 60 seconds.

5. A method according to claim 1 wherein the gas analyzer can measure exhaust gas temperature and pressure.

6. A method according to claim 1 wherein the gas analyzer further comprises processing means to calculate carbon dioxide concentration, total nitrogen oxides concentration, sulphur dioxide concentration, combustion efficiency, and lambda.

7. A method according to claim 1 wherein the gas is carbon monoxide, carbon dioxide, nitrogen oxide, nitrogen dioxide, oxygen, sulphur dioxide, hydrocarbons and combinations thereof.

8. A system for monitoring steady-state exhaust emissions of a combustion engine, the system comprising:
    (a) a gas analyzer for measuring the concentration of at least one exhaust gas from the exhaust emissions of an engine that is running at operating temperature, and wherein the temperature of the exhaust gas has been stabilized to a maximum value with a 60 second engine stall smoke density test, the gas analyzer comprising a gas probe to be inserted in the exhaust system and coupled thereto, the analyzer further comprising at least one gas sensor for sensing at least one exhaust gas;

(b) processing means for processing data collected from the gas analyzer; and (c) display means coupled to the processing means to allow an operator to follow data collection in real time and to monitor exhaust emissions through a progress window;

wherein the processing means and display means are used to create custom functions using the data collected from the gas analyzer.

9. A system according to claim 8 wherein the gas analyzer can measure exhaust gas temperature and pressure.

10. A system according to claim 8 wherein the gas is carbon monoxide, carbon dioxide, nitrogen oxide, nitrogen dioxide, oxygen, sulphur dioxide, hydrocarbons and combinations thereof.

11. A system according to claim 8 wherein the gas analyzer further comprises processing means to calculate carbon dioxide concentration, total nitrogen oxides concentration, sulphur dioxide, combustion efficiency and lambda.

12. A system according to claim 8 further comprising storing means for storing data processed in step b).

13. A system according to claim 8 wherein the engine is running at full throttle, full converter and hydraulic stall conditions.

* * * * *